UNITED STATES PATENT OFFICE.

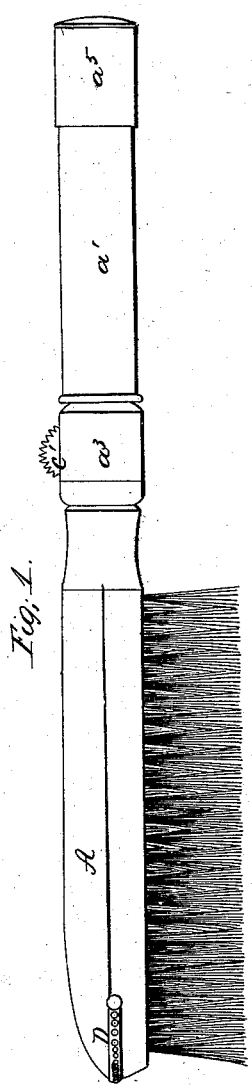
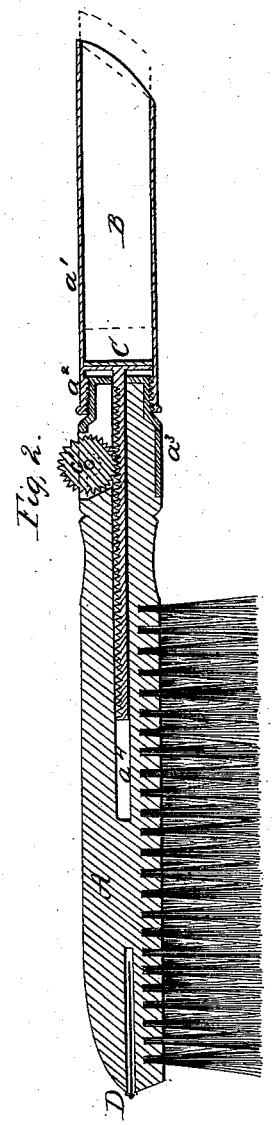

JOHN MAYER, OF PHILADELPHIA, PENNSYLVANIA.

IMPROVEMENT IN HAIR-BRUSHES.

Specification forming part of Letters Patent No. 48,295, dated June 20, 1865.

*To all whom it may concern:*

Be it known that I, JOHN MAYER, of the city of Philadelphia, in the State of Pennsylvania, have invented a new and useful Improvement in Hair-Brushes; and I do hereby declare that the following is a full and exact description of the construction and operation of the same, reference being had to the accompanying drawings, making a part of this specification, in which—

Figure 1 is a perspective view of the said improved brush, and Fig. 2 a view of the inner side of one-half part of the same, cut vertically through the middle of its length, like letters of reference indicating the same parts when in both figures.

As hair-dressers and barbers use pomades in dressing the hair, it is a matter of importance to them, as affording facility in their operations, to have the pomade and brush close at hand, and so that the one need not be laid down to pick up the other, nor his hands become too much soiled with the pomade; and the object of my invention is to afford this facility and cleanliness in the most perfect and effective manner.

The nature of my invention consists in making the handle of the brush tubular and fitting within it a cylinder of pomade, so that the latter can be readily and sufficiently protruded for use, as occasion may require, at the uncovered end of the handles substantially by means of a concealed rack and piston or its equivalent operated by one's thumb or finger applied to a spur-wheel or its equivalent, which slightly projects on the outer side of the said handle.

In the drawings, A is the brush, which is of the size and form generally used by barbers and hair-dressers, having the tubular handle $a'$ applied thereto; B, the pomade; C, the rack and piston, and $c'$ the spur-wheel for operating it by.

The tubular portion of the handle $a'$ in this instance is made principally of thin sheet-brass in a cylindrical form, and having on the inner side of one end a screw-thread, $a^2$, matching another screw-thread on a shorter cylinder, $a^3$, which is fixed permanently around the handle end of the brush A. This shorter cylinder $a^3$ carries the spur-wheel $c'$, and has also a hole made in the middle of its outer end, through which the rack C passes freely and connects with the wheel $c'$ of the brush A, the latter having a corresponding hole, $a^4$, of sufficient depth for the reception of the said rack when its piston end is run back against the inner end of the tubular handle $a'$; and the rack C is made of sufficient length to remain in contact with the spur-wheel $c'$ when the piston end is run out to the outer end of the handle $a'$. (See Fig. 2.)

The pomade B is solid and made to fit the interior portion of the tubular handle $a'$, and the outer end of it, as well as that of the handle, is sloped to an angle of about forty-five degrees. The end of the said handle is also fitted with a removable cap, $a^5$, or cover, as represented in Fig. 1.

In the operation of this brush, when the use of the pomade is required, the operator removes the cap $a^5$, and by his thumb or finger used to rotate the wheel $c'$ the rack and piston is caused to force out the sloped end of the pomade, so that it can be used alternately with the brush A, and with the greatest facility, without soiling his hands, and without laying down the one to pick up the other, as heretofore.

The head end of the brush is in this instance also provided with a pin-cushion, D, which, although an attachment of secondary importance, affords facility of access for pins, which are sometimes required in dressing the hair.

Having thus fully described my improved hair-brush, what I claim as new therein, of my invention, and desire to secure by Letters Patent, is—

A hair-brush having a tubular handle provided with any suitable pomade, and constructed so as to operate substantially in the manner and for the purpose described.

JOHN MAYER.

Witnesses:
   BENJ. MORISON,
   G. C. KOPP.